United States Patent
Ki et al.

(10) Patent No.: US 12,530,298 B2
(45) Date of Patent: *Jan. 20, 2026

(54) SYSTEM AND METHOD OF DETERMINING AVAILABLE BANDWIDTH IN DISAGGREGATED TIERED CACHE FOR CLOUD CONTENT STORAGE

(71) Applicant: Samsung Electronics Co., Ltd., Suwon-si (KR)

(72) Inventors: Yang Seok Ki, Palo Alto, CA (US); Sungwook Ryu, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,767

(22) Filed: Sep. 1, 2023

(65) Prior Publication Data

US 2023/0409479 A1      Dec. 21, 2023

Related U.S. Application Data (63) Continuation of application No. 17/008,509, filed on Aug. 31, 2020, now Pat. No. 11,782,833.

(Continued)

(51) Int. Cl.
*G06F 12/0813* (2016.01)
*G06F 13/42* (2006.01)

(52) U.S. Cl.
CPC ...... *G06F 12/0813* (2013.01); *G06F 13/4221* (2013.01); *G06F 2213/0026* (2013.01)

(58) Field of Classification Search
CPC .......................... G06F 12/0813; G06F 13/4221
See application file for complete search history.

(56) References Cited

U.S. PATENT DOCUMENTS

| | | |
|---|---|---|
| 8,615,594 B2 | 12/2013 | Liu et al. |
| 9,396,195 B1 | 7/2016 | Beguelin |

(Continued)

FOREIGN PATENT DOCUMENTS

| | | |
|---|---|---|
| CN | 108427650 A | 8/2018 |
| CN | 109799951 A | 5/2019 |

(Continued)

OTHER PUBLICATIONS

Korean Office Action dated Apr. 16, 2024, issued in Korean Patent Application No. 10-2021-0007275 (6 pages).

(Continued)

*Primary Examiner* — Tammara R Peyton
(74) *Attorney, Agent, or Firm* — Womble Bond Dickinson (US) LLP (57) ABSTRACT

A content provider system includes: a repository to store a catalog of content; a storage device pool to load content from among the catalog of content from the repository into one or more storage devices of the storage device pool; a first hosted device communicably connected to the storage device pool, and to execute the content stored in the storage device pool to provide the content to a first user device; a second hosted device communicably connected to the storage device pool, and to execute the content stored in the storage device pool to provide the content to a second user device; and one or more processing circuits to identify an available storage device from among the one or more storage devices of the storage device pool for serving a requested content to a requesting device from among the first and second hosted devices.

18 Claims, 8 Drawing Sheets

Related U.S. Application Data (60) Provisional application No. 63/056,474, filed on Jul. 24, 2020, provisional application No. 63/012,053, filed on Apr. 17, 2020, provisional application No. 63/012,050, filed on Apr. 17, 2020, provisional application No. 62/988,912, filed on Mar. 12, 2020.

(56) References Cited

U.S. PATENT DOCUMENTS

| | | | |
|---|---|---|---|
| 9,566,503 | B2 | 2/2017 | Lee |
| 9,619,389 | B1 | 4/2017 | Roug |
| 10,394,305 | B2 | 8/2019 | Kim |
| 10,610,779 | B2 * | 4/2020 | Hunter .................. A63F 13/35 |
| 10,768,820 | B2 | 9/2020 | Subramanian et al. |
| 10,817,218 | B2 | 10/2020 | Jo |
| 11,010,054 | B1 | 5/2021 | Himelstein et al. |
| 11,321,259 | B2 | 5/2022 | Colenbrander |
| 11,759,707 | B2 * | 9/2023 | Hunter .................. H04L 67/55 463/29 |
| 11,782,833 | B2 * | 10/2023 | Ki .................. G06F 16/24552 711/118 |
| 2006/0264239 | A1 | 11/2006 | Tominaga |
| 2009/0019248 | A1 | 1/2009 | Jeong et al. |
| 2009/0117890 | A1 | 5/2009 | Jacobsen et al. |
| 2009/0198954 | A1 | 8/2009 | Sanders |
| 2012/0004042 | A1 | 1/2012 | Perry et al. |
| 2013/0035165 | A1 | 2/2013 | Satake et al. |
| 2013/0344963 | A1 | 12/2013 | Gupta et al. |
| 2014/0215265 | A1 | 7/2014 | Mohanta et al. |
| 2015/0013016 | A1 | 1/2015 | Kanter et al. |
| 2015/0242877 | A1 | 8/2015 | Bliss et al. |
| 2015/0258437 | A1 | 9/2015 | Kruglick |
| 2015/0365489 | A1 | 12/2015 | Ann et al. |
| 2016/0299767 | A1 | 10/2016 | Mukadam |
| 2016/0335108 | A1 | 11/2016 | Ryu et al. |
| 2017/0050110 | A1 | 2/2017 | Perry |
| 2017/0087464 | A1 | 3/2017 | Perry et al. |
| 2017/0169176 | A1 | 6/2017 | Abiola |
| 2017/0199765 | A1 * | 7/2017 | Ahn .................. G06F 9/50 |
| 2018/0095915 | A1 | 4/2018 | Prabhakar et al. |
| 2018/0284876 | A1 | 10/2018 | Ray et al. |
| 2018/0361235 | A1 | 12/2018 | Hunter |
| 2019/0102206 | A1 | 4/2019 | Fichtenholtz et al. |
| 2019/0179805 | A1 | 6/2019 | Prahlad et al. |
| 2019/0235777 | A1 | 8/2019 | Wang et al. |
| 2019/0270019 | A1 | 9/2019 | Miura et al. |
| 2019/0387634 | A1 | 12/2019 | Aspnes et al. |
| 2020/0050403 | A1 | 2/2020 | Suri et al. |
| 2020/0094150 | A1 | 3/2020 | Miura et al. |
| 2020/0104153 | A1 | 4/2020 | Shibayama et al. |
| 2021/0042255 | A1 | 2/2021 | Colenbrander |
| 2021/0056603 | A1 | 2/2021 | Vidal |
| 2021/0056860 | A1 | 2/2021 | Fahrendorff et al. |
| 2021/0245047 | A1 | 8/2021 | Dharmapurikar et al. |
| 2021/0295654 | A1 | 9/2021 | Kiss et al. |

FOREIGN PATENT DOCUMENTS

| | | |
|---|---|---|
| CN | 109840050 A | 6/2019 |
| CN | 111338578 A | 6/2020 |
| KR | 10-2019-0056295 A | 5/2019 |
| KR | 10-2019-0060328 A | 6/2019 |
| TW | 201126356 A1 | 8/2011 |
| TW | I421692 B | 1/2014 |

OTHER PUBLICATIONS

Taiwanese Office Action dated May 1, 2024, issued in Taiwanese Patent Application No. 110107217 (4 pages).
US Office Action dated May 28, 2024, issued in U.S. Appl. No. 18/232,300 (24 pages).
AWS Cloud-based game architecture, 2017, 36 pages, URL: https://www.slideshare.net/awskorea/aws-cloud-game-architecture?from_action=save.
EPO Office Action dated Jan. 27, 2023, issued in corresponding European Patent Application No. 21164175.8 (8 pages).
U.S. Office Action dated Dec. 6, 2021, issued in U.S. Patent Application No. 16/987, 132 (36 pages).
U.S. Final Office Action dated Apr. 20, 2022, issued in U.S. Appl. No. 16/987,132 (39 pages).
U.S. Advisory Action dated Jul. 7, 2022, issued in U.S. Appl. No. 16/987,132 (3 pages).
US Office Action dated Sep. 21, 2022, issued in U.S. Appl. No. 16/987,132 (37 pages).
US Final Office Action dated Feb. 2, 2023, issued in U.S. Appl. No. 16/987,132 (40 pages).
US Notice of Allowance dated May 3, 2023, issued in U.S. Appl. No. 16/987,132 (12 pages).
Taiwanese Office Action dated Jul. 19, 2024, issued in Taiwanese Patent Application No. 110105022 (7 pages).
US Final Office Action dated Nov. 29, 2024, issued in U.S. Appl. No. 18/232,300 (24 pages).
US Office Action dated Mar. 14, 2025, issued in U.S. Appl. No. 18/232,300, 25 pages.
Korean Office Action corresponding to KR Application No. 10-2020-0177223, dated Jul. 17, 2025 (7 pages).
Chinese Office Action dated May 30, 2025, issued in Chinese Patent Application No. 202110178491.9, 10 pages.
US Notice of Allowance dated Jul. 16, 2025, issued in U.S. Appl. No. 18/232,300 (9 pages).
Chinese Notice of Allowance corresponding to CN Application No. 202110178491.9, dated Aug. 28, 2025 (7 pages).

* cited by examiner

SYSTEM AND METHOD OF DETERMINING AVAILABLE BANDWIDTH IN DISAGGREGATED TIERED CACHE FOR CLOUD CONTENT STORAGE

CROSS-REFERENCE TO RELATED APPLICATION(S)

This application is a continuation of U.S. patent application Ser. No. 17/008,509, filed on Aug. 31, 2020, which claims priority to and the benefit of U.S. Provisional Application No. 63/056,474, filed on Jul. 24, 2020, entitled "DISAGGREGATED TIERED CACHE FOR CLOUD GAME," Provisional Patent Application No. 62/988,912, filed on Mar. 12, 2020, Provisional Patent Application No. 63/012,050, filed on Apr. 17, 2020, and Provisional Patent Application No. 63/012,053, filed on Apr. 17, 2020, the entire content of all of which are incorporated by reference herein.

FIELD

Aspects of one or more example embodiments of the present disclosure relate to a disaggregated tiered cache, and more particularly, to a system and method of disaggregated tiered cache for cloud content storage.

BACKGROUND

As information technology society evolves, an increased amount of data is being stored and served remotely, for example, from data centers, cloud storage systems, and/or the like. For example, data centers, cloud storage systems, and/or the like may generally include a network of compute resources and storage resources. The compute resources may process data stored in the storage resources to provide the processed data to a user. However, due to data processing resource limitations, efficient use of the storage resources may be limited.

The above information disclosed in this Background section is for enhancement of understanding of the background of the present disclosure, and therefore, it may contain information that does not constitute prior art.

SUMMARY

One or more example embodiments of the present disclosure are directed to a cloud content storage system, and a method for dissegregated tiered cache sharing thereof.

According to one or more example embodiments of the present disclosure, a content provider system includes: a repository configured to store a catalog of content; a storage device pool configured to load content from among the catalog of content from the repository into one or more storage devices of the storage device pool; a first hosted device communicably connected to the storage device pool, and configured to execute the content stored in the storage device pool to provide the content to a first user device; a second hosted device communicably connected to the storage device pool, and configured to execute the content stored in the storage device pool to provide the content to a second user device; and one or more processing circuits configured to identify an available storage device from among the one or more storage devices of the storage device pool for serving a requested content to a requesting device from among the first and second hosted devices.

In an embodiment, the first and second hosted devices may be configured to communicate using Peripheral Component Interconnect Express (PCIe).

In an embodiment, the first and second hosted devices may be connected to the storage device pool by a network interface card (NIC) or a PCIe bus.

In an embodiment, the one or more storage devices of the storage device pool may include one or more shared namespaces associated with the content stored in the one or more storage devices, and including partition information and a logical unit number (LUN) corresponding to the content stored in the one or more storage devices.

In an embodiment, the one or more processing circuits may be configured to: receive a request for the requested content from at least one of the first and second devices; identify a first storage device from among the storage device pool having the requested content stored in the one or more shared namespaces thereof; and determine an available bandwidth of the first storage device for serving the requested content to the requesting device.

In an embodiment, the one or more processing circuits may be configured to: determine that the available bandwidth of the first storage device is less than a threshold bandwidth; and identify a second storage device from among the storage device pool for serving the requested content to the requesting device.

In an embodiment, the one or more processing circuits may be configured to: determine that the requested content is not stored in the one or more shared namespaces of the second storage device; determine that the second storage device has an available namespace with enough space to store the requested content; determine that an available bandwidth of the second storage device is greater than the threshold bandwidth; and load the requested content from the repository to the available namespace of the second storage device.

In an embodiment, the one or more processing circuits may be configured to: identify an inactive content stored in the available namespace of the second storage device; determine that the available namespace has enough space by removing the inactive content; and remove the inactive content from the available namespace to provide the space for the requested content.

In an embodiment, the requesting device may include a local file system, and the one or more processing circuits may be configured to provide a mount location of the requested content to the local file system of the requesting device.

According to one or more example embodiments of the present disclosure, a method for a content provider system including a repository storing a catalog of content; a storage device pool storing at least some content from among the catalog of content; a first hosted device communicably connected to the storage device pool to execute the content stored in the storage device pool; and a second hosted device communicably connected to the storage device pool to execute the content stored in the storage device pool, includes: receiving, by one or more processors, a request for a requested content from a requesting device from among the first and second hosted devices; and identifying, by the one or more processors, an available storage device from among the storage device pool for serving the requested content to the requesting device.

In an embodiment, the first and second hosted devices may communicate using Peripheral Component Interconnect Express (PCIe).

In an embodiment, the first and second hosted devices may be connected to the storage device pool by a network interface card (NIC) or a PCIe bus.

In an embodiment, one or more storage devices of the storage device pool may include one or more shared namespaces associated with the content stored in the storage device pool, and including partition information and a logical unit number (LUN) corresponding to the content stored in the storage device pool.

In an embodiment, the method may further include: identifying, by the one or more processors, a first storage device from among the storage device pool having the requested content stored in the one or more shared namespaces thereof; and determining, by the one or more processors, an available bandwidth of the first storage device for serving the requested content to the requesting device.

In an embodiment, the method may further include: determining, by the one or more processors, that the available bandwidth of the first storage device is less than a threshold bandwidth; and identifying, by the one or more processors, a second storage device from among the storage device pool for serving the requested content to the requesting device.

In an embodiment, the method may further include: determining, by the one or more processors, that the requested content is not stored in the one or more shared namespaces of the second storage device; determining, by the one or more processors, that the second storage device has an available namespace with enough space to store the requested content; determining, by the one or more processors, that an available bandwidth of the second storage device is greater than the threshold bandwidth; and loading, by the one or more processors, the requested content from the repository to the available namespace of the second storage device.

In an embodiment, the method may further include: identifying, by the one or more processors, an inactive content stored in the available namespace of the second storage device; determining, by the one or more processors, that the available namespace has enough space by removing the inactive content; and removing, by the one or more processors, the inactive content from the available namespace to provide the space for the requested content.

In an embodiment, the requesting device may include a local file system, and the method may further include: providing, by the one or more processors, a mount location of the requested content to the local file system of the requesting device.

According to one or more example embodiments of the present disclosure, a system includes: a repository configured to store a catalog of content; a storage device pool configured to load content from among the catalog of content from the repository into one or more storage devices of the storage device pool; a first hosted device configured to communicate with the storage device pool using a Peripheral Component Interconnect Express (PCIe) interface for accessing the content stored in the storage device pool, and to execute the content to stream the content to a first user device; a second hosted device configured to communicate with the storage device pool using the PCIe interface for accessing the content stored in the storage device pool, and to execute the content stored in the storage device pool to stream the content to a second user device; a network interface card or a PCIe bus configured to communicably connect the storage device pool to the first and second hosted devices; and one or more processing circuits configured to: receive a request for a requested content from a requesting device from among the first and second hosted devices; identify an available storage device from among the storage device pool for serving the requested content to the requesting device; and provide a mount location of the requested content to a local file system of the requesting device for executing the requested content.

In an embodiment, the one or more processing circuits may be configured to: identify a first storage device from among the storage device pool storing the requested content; determine an available bandwidth of the first storage device for serving the requested content to the requesting device; determine that the available bandwidth of the first storage device is less than a threshold bandwidth; identify a second storage device from among the storage device pool for serving the requested content to the requesting device; load the requested content from the repository to the second storage device; and provide the mount location of the requested content stored in the second storage device to the local file system of the requesting device.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Generally, cloud gaming services for console-based gaming platforms enable users of such console-based gaming platforms to remotely run and play games that are stored in the cloud. For example, these cloud gaming services may host multiple physical console devices in a rack server, such that each of the hosted devices loads, executes, and streams a game directly to a user's personal device. In other words, each of the physical console devices hosted by the rack server may load a game stored in the cloud, may locally execute the game, and may stream the game directly to a user's personal device to enable the user to play the game remotely without having to directly download the game (e.g., an entirety of the game or a portion of the game) on the user's personal device.

For example, each hosted device may correspond to a physical console device of the console-based gaming platform, such that each of the hosted devices may have a local processor, for example, such as a central processing unit (e.g., a CPU), a graphics processing unit (e.g., a GPU), or an application processing unit (e.g., an APU), which may correspond to a combination of a CPU/GPU, and a local storage resource, for example, such as a Solid State Drive (SSD). In this case, a requested game may be directly loaded in the local storage resource from a repository of games (e.g., from a cloud storage) as needed. However, the local processor of each hosted device may become saturated, for example, during game play, such that the local storage resource of each hosted device may be underutilized, even when the local storage resource has bandwidth and/or capacity, for example, to serve other users. Accordingly, while utilization of the local processor of each hosted device may be maximized, for example, by hosting multiple users on each hosted device, the local storage resource thereof may still be underutilized, as utilization of the local storage resource may be limited by saturation of the local processor thereof.

According to one or more example embodiments of the present disclosure, rather than using a local storage device as the primary storage resource of the hosted device, a disaggregated tiered cache may be provided such that a storage device pool including a plurality of storage devices may be shared by a plurality of hosted devices, for example, such that the storage device pool may serve a plurality of hosted devices concurrently (e.g., simultaneously or at the same time). For example, game requests by the hosted devices may be distributed to suitable ones of the storage devices in the storage device pool, such that the requested games may be efficiently served by the storage device pool. In this case, a suitable one of the storage devices having the requested game stored thereon from among the storage device pool may be assigned to serve the requested game to a requesting hosted device, or the requesting game may be loaded from a repository into a suitable one of the storage devices from among the storage device pool to serve the requested game to the requesting hosted device. Thus, the local storage resource of each of the hosted devices may be used as a local cache, for example, to store popular games of the corresponding hosted device or to temporarily store games for active users of the corresponding hosted device in case that the shared storage cannot serve the games due to space and/or bandwidth limitations, or may be omitted as needed or desired. Accordingly, utilization of the storage resources may be improved.

Figure 1:
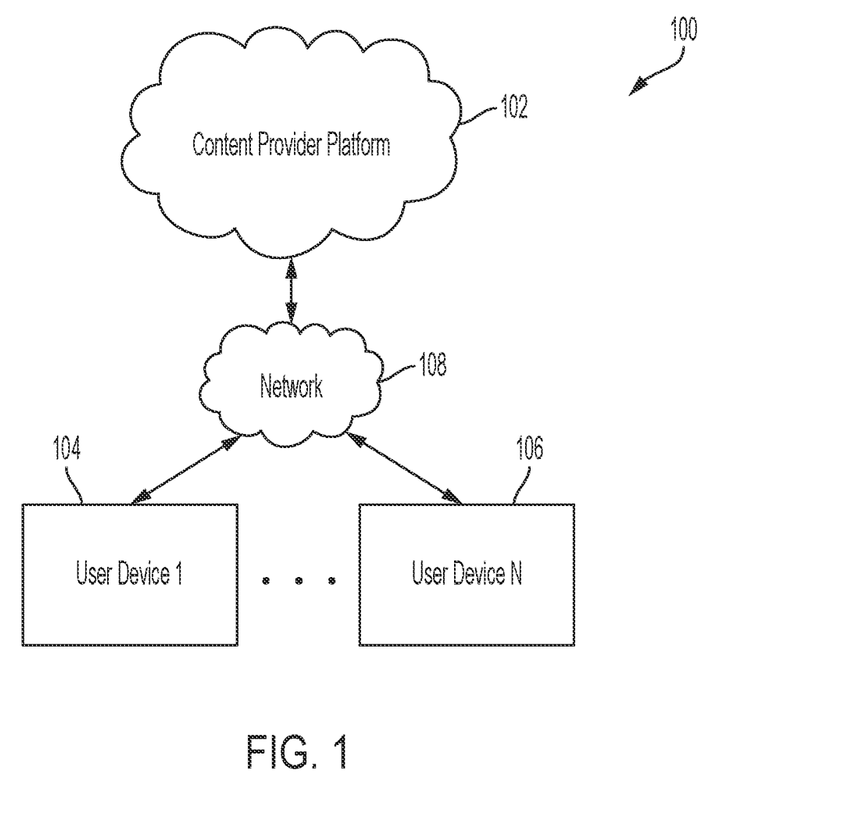
FIG. 1 illustrates a block diagram of a content provider system, according to one or more example embodiments of the present disclosure.

FIG. 1 illustrates a block diagram of a content provider system, according to one or more example embodiments of the present disclosure.

Referring to FIG. 1, a content provider system 100 may include a content provider platform 102 and one or more user devices 104 to 106. The one or more user devices 104 to 106 may access the content provider platform 102 over a communication network (e.g., wide area network (WAN), a local area network (LAN), the Internet, a cellular network, and/or the like) 108 to access content served by the content provider platform 102. For example, in some embodiments, the content provider platform 102 may provide video content, game content, and/or the like, which may be streamed by the one or more user devices 104 to 106 over the communication network 108. Hereinafter, for convenience, the content provider system 100 may be described in the context of a cloud gaming service for a console-based gaming platform such that the content provider platform corresponds to a cloud gaming provider platform, but the present disclosure is not limited thereto, and in various embodiments, the content provider system 100 may provide any suitable kinds of content to a user device, for example, such as video streaming content, audio streaming content, data searching content, and/or the like.

Each of the one or more user devices 104 to 106 may correspond to a suitable computing device to enable a user of the user device (e.g., 104 or 106) to receive (e.g., to stream) content (e.g., game content) from the content provider platform 102, and to provide control signals to the content provider platform 102 to control the content (e.g., to control in-game content). For example, in some embodiments, each of the one or more user devices 104 to 106 may include a console device corresponding to a console-based gaming platform associated with the content provider platform 102, but the present disclosure is not limited thereto. For example, each of the user devices 104 to 106 may include any suitable computing device having at least a thin-shell application or an emulator application installed thereon to receive and control the content served by the content provider platform 102, for example, such as a mobile phone, a smart phone, a tablet, a personal computer PC, a laptop computer, a smart wearable device, and/or the like. In other examples, each of the user devices 104 to 106 may include a smart television, a media streaming device, a media streaming dongle, and/or the like to enable the user to stream media served by the content provider platform 102. In some embodiments, each of the user devices 104 to 106 may communicate with the content provider platform 102 over the communication network 108 to enable a user thereof to remotely select, load, and/or execute (e.g., run) a game stored at the content provider platform 102.

Figure 2:
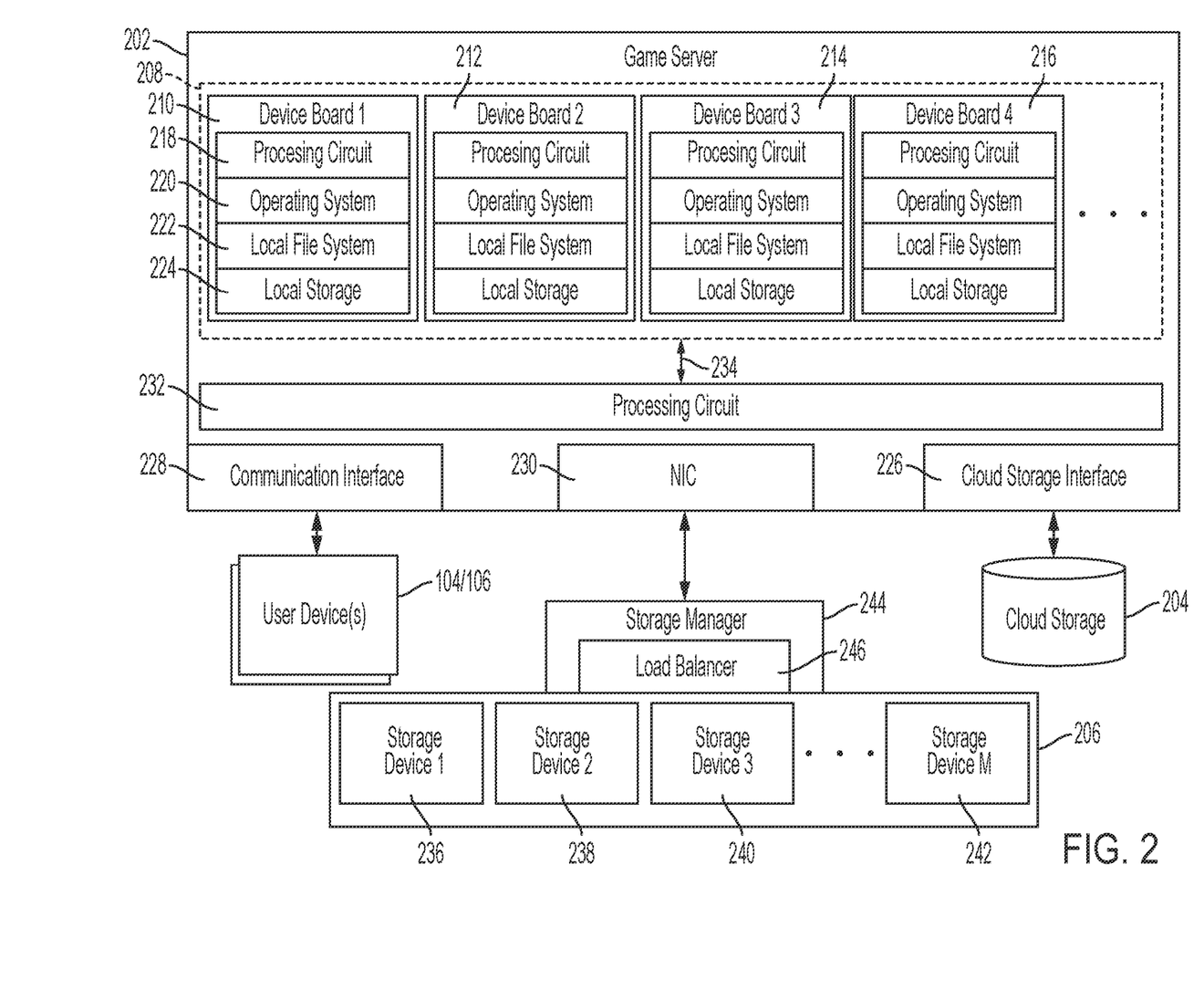
FIG. 2 illustrates a block diagram of a content provider platform, according to one or more example embodiments of the present disclosure.
Figure 3:
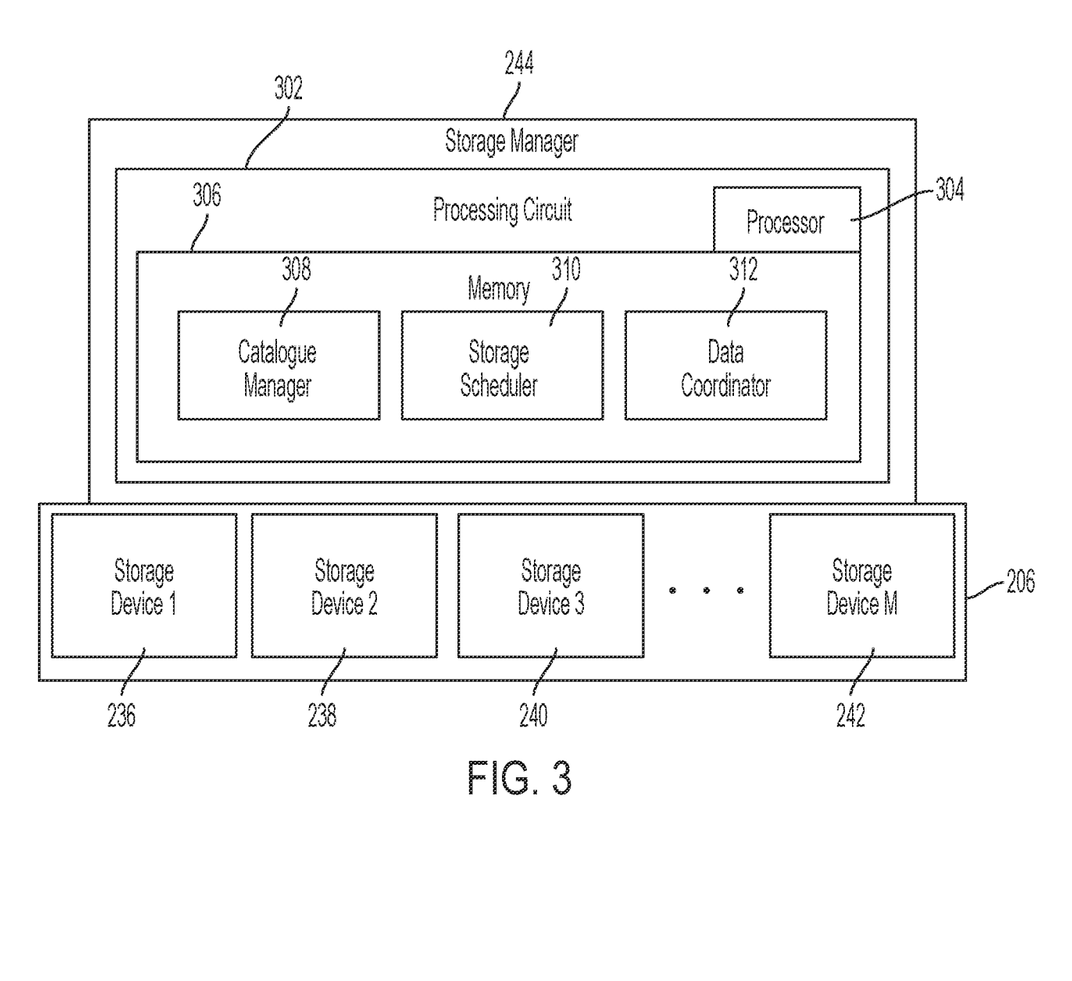
FIG. 3 illustrates a block diagram of a storage manager, according to one or more example embodiments of the present disclosure.

FIG. 2 illustrates a block diagram of a content provider platform, according to one or more example embodiments of the present disclosure.

Referring to FIG. 2, in one or more example embodiments of the present disclosure, the content provider platform 102 may include a game server 202, cloud storage 204, and a storage device pool 206. The game server 202 may include one or more rack servers 208, and one or more processing circuits 232. Each of the one or more rack servers 208 may include a plurality of device boards 210 to 216. Each of the device boards 210 to 216 may correspond to a device board of a console device, such that each of the device boards 210 to 216 may execute (e.g., may run) a game of the console device. For example, in some embodiments, each of the device boards 210 to 216 may include a processing circuit (e.g., a CPU, a GPU, an APU, and/or the like) 218, an operating system 220 of the console device, a local file system 222, and local storage (e.g., a local storage device, for example, such as an SSD) 224. While FIG. 2 illustrates that a rack server 208 includes 4 or more device boards 210 to 216, the present disclosure is not limited thereto, and the rack server 208 may include any suitable number of device boards, for example, such as 8 or more device boards.

In one or more example embodiments of the present disclosure, each of the device boards 210 to 216 of the one or more rack servers 208 may share the same storage device pool 206. For example, the device boards 210 to 216 of the rack server 208 may be communicably connected to the storage device pool 206 via a network interface controller (NIC) 230 or a bus (e.g., a Peripheral Component Interconnect Express (PCIe) bus) to write to and/or to read from the one or more storage devices 236 to 243 of the storage device pool 206. For example, in some embodiments, each of the device boards 210 to 216 may be connected to a processing circuit 232 of the game server 202 via a suitable storage interface 234, and the processing circuit 232 of the game server 202 may be communicably connected to the storage device pool 206 via the NIC 230 or the bus (e.g., the PCIe bus).

The storage interface 234 may facilitate communications (e.g., using a connector and a protocol) between the device boards 210 to 216 and the storage device pool 206 (e.g., via the NIC 230). In some embodiments, the storage interface 234 may facilitate the exchange of storage requests and responses between the device boards 210 to 216 and the storage device pool 206 (e.g., via the NIC 230 or the PCIe bus). In some embodiments, the storage interface 234 may facilitate data transfers by the storage device pool 206 to and from the device boards 210 to 216 (e.g., via the NIC 230). For example, in some embodiments, the device boards 210 to 216 may exchange storage requests and responses with the processing circuit 232 via the storage interface 234, and the processing circuit 232 may translate the storage requests and responses from a first protocol (e.g., a protocol of the storage interface 234) to a second protocol (e.g., an application programming interface (API) and/or the like) associated with the NIC 230 and/or from the second protocol to the first protocol, to facilitate communications between the device boards 210 to 216 and the storage device pool 206.

In an embodiment, the storage interface 234 (e.g., the connector and the protocol thereof) may include (or may conform to) Peripheral Component Interconnect Express (PCIe), and/or the like. However, the present disclosure is not limited thereto, and in other embodiments, the storage interface 234 (e.g., the connector and protocol thereof) may conform to other suitable storage interfaces, for example, such as Small Computer System Interface (SCSI), Serial Attached SCSI (SAS), remote direct memory access (RDMA) over Ethernet, Serial Advanced Technology Attachment (SATA), Fiber Channel, Non Volatile Memory Express (NVMe), NVMe over Fabric (NVMe-oF), and/or the like. In other embodiments, the storage interface 234 (e.g., the connector and the protocol thereof) may include (or may conform to) various general-purpose interfaces, for example, such as Ethernet, Universal Serial Bus (USB), and/or the like. For convenience, the storage interface 234 may be described hereinafter in the context of a PCIe interface, but the present disclosure is not limited thereto.

While the storage device pool 206 is shown in FIG. 2 as being external to the game server 202 and communicably connected to the game server 202 via the NIC 230, the present disclosure is not limited thereto. For example, in other embodiments, the storage device pool 206 as shown in FIG. 2 may be external to the game server 202 and communicably connected to the game server 202 via a PCIe bus. In another example, in other embodiments, the storage pool 206 may be implemented as internal storage of the game server 202 with appropriate modifications to the interfaces (e.g., the storage interface 234, the NIC 230, and/or the like) thereof. Further, but the present disclosure is not limited thereto, and each of the shared namespaces 402 may have any suitable number of namespaces and any suitable number of streams per namespace depending on resources thereof (e.g., storage device interface such as PCIe Gen3/4/5, the bandwidth requirements of games, a capacity, a resize function, and/or the like).

Figure 4:
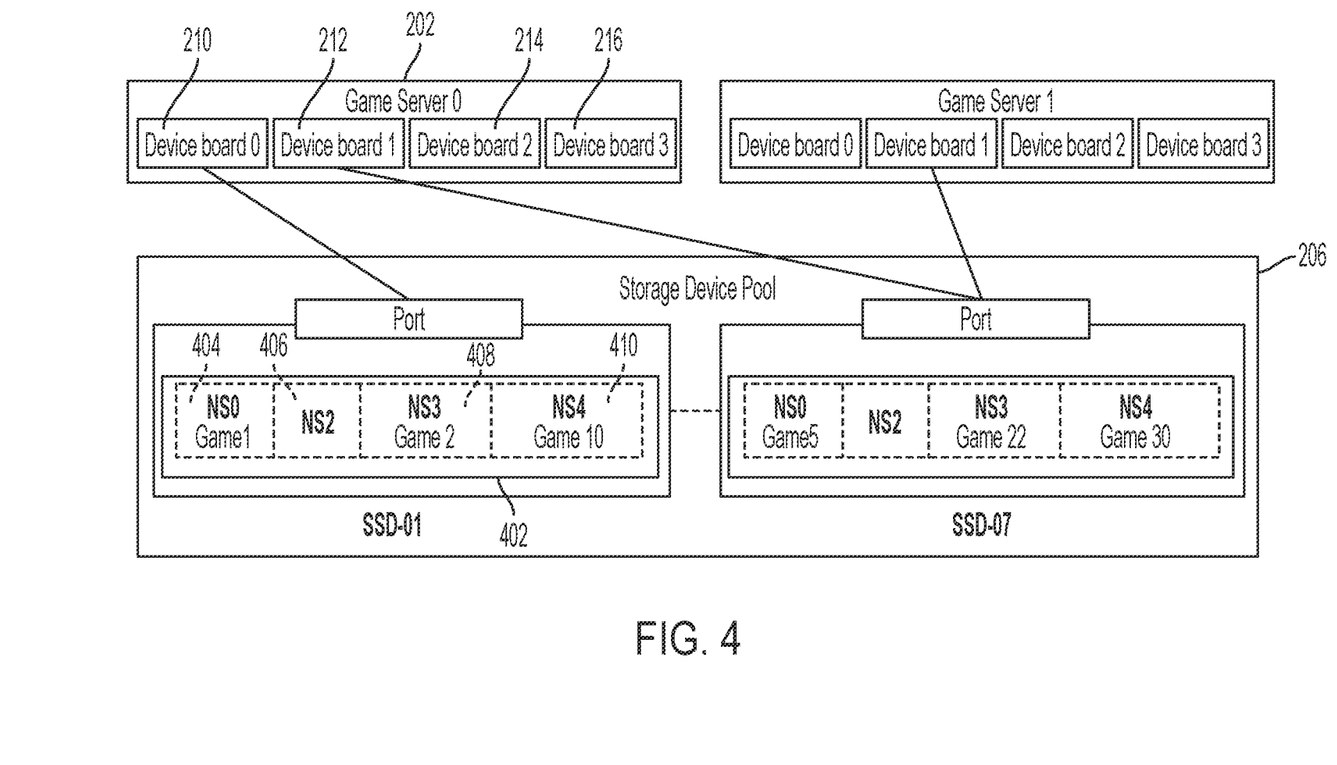
FIG. 4 illustrates a block diagram of a storage device configuration, according to one or more example embodiments of the present disclosure.

While FIG. 4 shows that each of the device boards 210 to 216 of a corresponding game server connected to the storage device pool 206, the present disclosure is not limited thereto, and each of the device boards 210 to 216 may correspond to any suitable disk, storage media, or server implementation, for example, such as a redundant array of independent disks (RAID), a blade, a rack, and/or the like.

The catalog manager 308 may use (e.g., may monitor or may access) each of the shared namespaces 402 to determine various states of a game being loaded on the corresponding storage device. For example, the catalog manager 308 may monitor for updates to the shared namespaces 402 (e.g., by the data coordinator 312) to determine whether a game being loaded therein has completed loading. However, the present disclosure is not limited thereto, and in other embodiments, the catalog manager 308 may receive a notification (e.g., from the data coordinator 312) when any of the shared namespaces 402 are updated.

The storage scheduler 310 may determine a suitable storage device from among the storage device pool 206 that may serve a requested game to the requesting device board. In some embodiments, the storage scheduler 310 may identify one or more storage devices from among the storage device pool 206 that may serve the requested game without loading the game from cloud storage 204. For example, the storage scheduler 310 may identify one or more storage devices from among the storage device pool 206 that currently has the requested game loaded in the shared namespace 402 thereof. In some embodiments, the storage scheduler 310 may identify a suitable one from among the one or more storage devices having the requested game stored thereon to serve the requested game to the requesting device board based on metrics. For example, in some embodiments, the storage scheduler 310 may determine whether any of the one or more storage devices that currently has the requested game loaded therein has enough bandwidth to serve the requested game to the requesting device board. In some embodiments, if more than one storage device from among the storage device pool 206 has the requested game currently stored therein and enough bandwidth to serve the requested game, the storage scheduler 310 may select a suitable one of the storage devices currently storing the game based on a comparison of available bandwidths thereof such that the load may be distributed across the storage devices.

In some embodiments, the storage scheduler 310 may determine that none of the storage devices 236 to 242 from among the storage device pool 206 has the requested game stored thereon. In this case, the storage scheduler 310 may select a suitable one of the storage devices 236 to 242 for loading the requested game from the cloud storage 204 into a namespace 402 thereof based on various metrics, such that the selected storage device may serve the requested game to the requesting device board. For example, in some embodiments, a storage device from among the storage device pool 206 may load a requested game when the storage device does not have the requested game currently loaded therein (e.g., does not have the requested game loaded in any of the namespaces 402 thereof), the storage device has enough space for the requested game, and the aggregate bandwidth of active games (e.g., games currently being served by or streamed from the storage device) including the requested game is less than the bandwidth (e.g., the available bandwidth or the total available bandwidth) of the storage device.

The data coordinator 312 may configure the storage devices 236 to 242 of the storage device pool 206, and may control writing (e.g., loading) to and reading from the storage device pool 206. For example, when the storage scheduler 310 determines that a requested game should be loaded into an available namespace 402 of a suitable storage device from among the storage device pool 206, the data coordinator 312 may read the requested game (e.g., the requested game title) from the cloud storage 204, and may load (e.g., may write) the requested game to the suitable storage device of the storage device pool 206. In some embodiments, the data coordinator 312 may update local file system of each of the device boards 210 to 216 to ensure that the local file system 222 of each of the device boards 210 to 216 has the latest updates (e.g., the updates to the namespaces 402) of the storage devices 236 to 242. Accordingly, in some embodiments, rather than using a distributed file system, for example, such as a digital file system, and/or the like, which may increase latency, complexity, and costs, the data coordinator 312 may remount the namespaces 402 to the local file system 222 of each of the device boards 210 to 216 as needed or desired (e.g., when there is an update to any of the namespaces 402 of the storage devices 236 to 242).

FIGS. 5A-5D are flow diagrams of a method for disaggregated tiered cache sharing, according to one or more example embodiments of the present disclosure.

However, the present disclosure is not limited to the sequence or number of the operations of the method 500 shown in FIGS. 5A-5D, and can be altered into any desired sequence or number of operations as recognized by a person having ordinary skill in the art. For example, in some embodiments, the order may vary, or the method may include fewer or additional operations. Further, the operations shown in the method 500 may be performed by any suitable one of the components or any suitable combination of the components of those of one or more example embodiments described above.

Figure 5A:
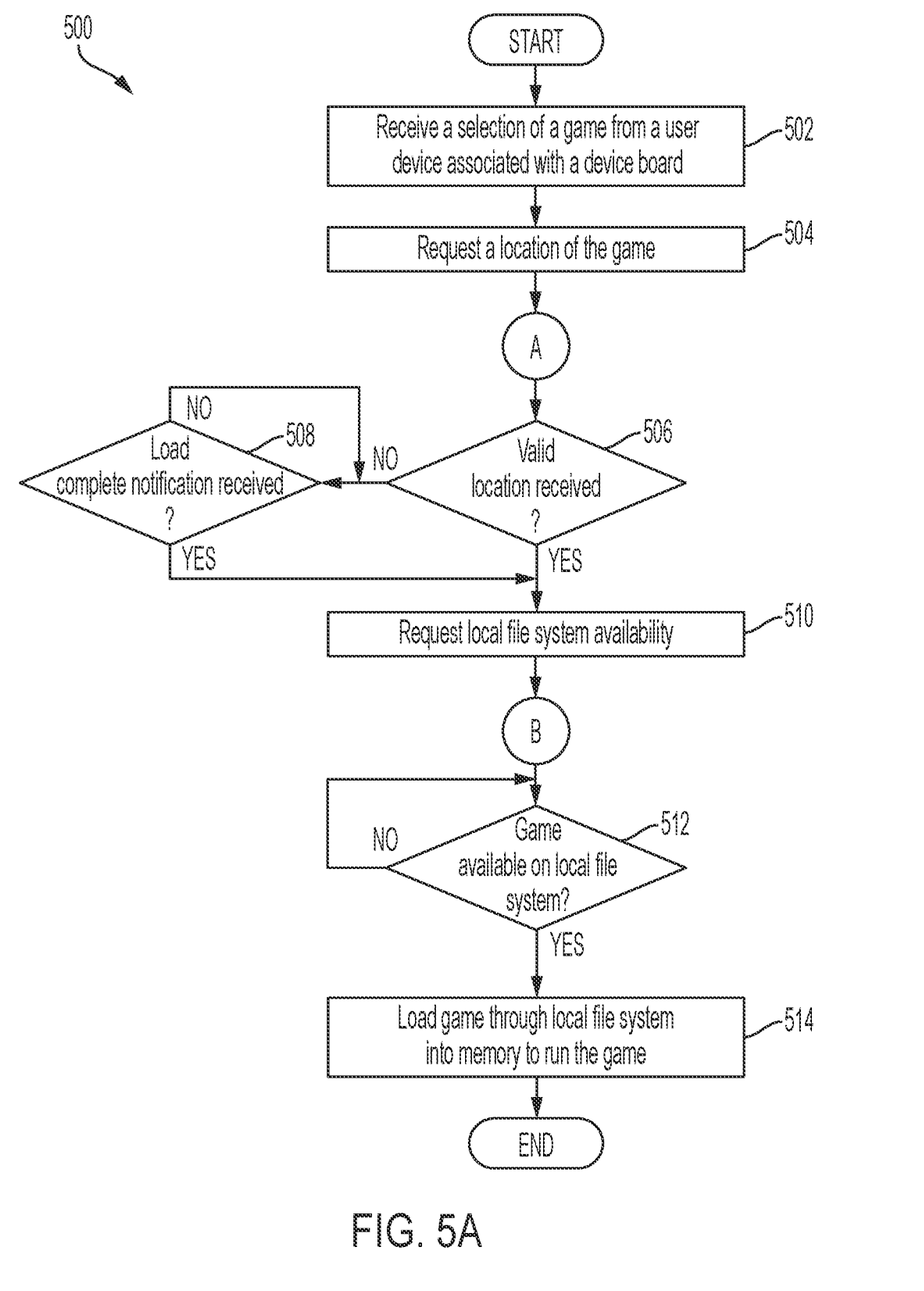
FIGS. 5A-5D are flow diagrams of a method for disaggregated tiered cache sharing, according to one or more example embodiments of the present disclosure.

Referring to FIG. 5A, the method 500 starts, and a selection of a game is received from a user device associated with a device board (e.g., a device board) at block 502. For example, in some embodiments, the user may use a user device (e.g., 104 or 106) to communicate with one of the device boards 210 to 216 to select a game from the catalog of games served by the content provider platform 102. A location of the game is requested at block 504. For example, the device board may request a location of the game to the catalog manager 308, and the method 500 may continue at block 516, which will be described in more detail below with reference to FIG. 5B.

Still referring to FIG. 5A, a determination is made whether a valid location is received at block 506. For example, in some embodiments, the device board may determine whether a valid location is received from the catalog manager 308 at block 506, and if not (e.g., NO at 506), then whether a load complete notification is returned from the catalog manager 308 at block 508. For example, in some embodiments, at block 506, the device board may determine whether the catalog manager 308 returns a game location and timestamp (e.g., see block 520 in FIG. 5B), and at block 508, the device board may determine whether the catalog manager 308 returns a load complete notification with the game location and timestamp (e.g., see block 540 in FIG. 5B). If not (e.g., NO at 508), the device board may continue to wait until the load complete notification is received at block 508.

On the other hand, if the device board receives the location and timestamp (e.g., YES at either 506 or 508), a determination may be made whether the device board's local file system 222 is available at block 510. For example, in some embodiments, the device board may request the data coordinator 312 to check whether the device board's local file system 222 has the updated game location at block 510, and the method 500 may continue at block 544, which will be described in more detail below with reference to FIG. 5C.

Still referring to FIG. 5A, a determination may be made whether the game is available on the local file system at block 512. For example, in some embodiments, the device board may wait for a notification indicating that its local file system 222 has been updated (e.g., see block 552 in FIG. 5C). If the notification has not been received (e.g., NO at block 512), the device board may continue to wait for its local file system 222 to be mounted (e.g., see block 546 in FIG. 5C) or remounted (e.g., see block 550 in FIG. 5C). On the other hand, if the notification is received (e.g., YES at block 512), the device board may load the game into internal memory thereof via its local file system 222 to run (e.g., to execute) the game at block 514, and the method 500 may end.

Figure 5B:
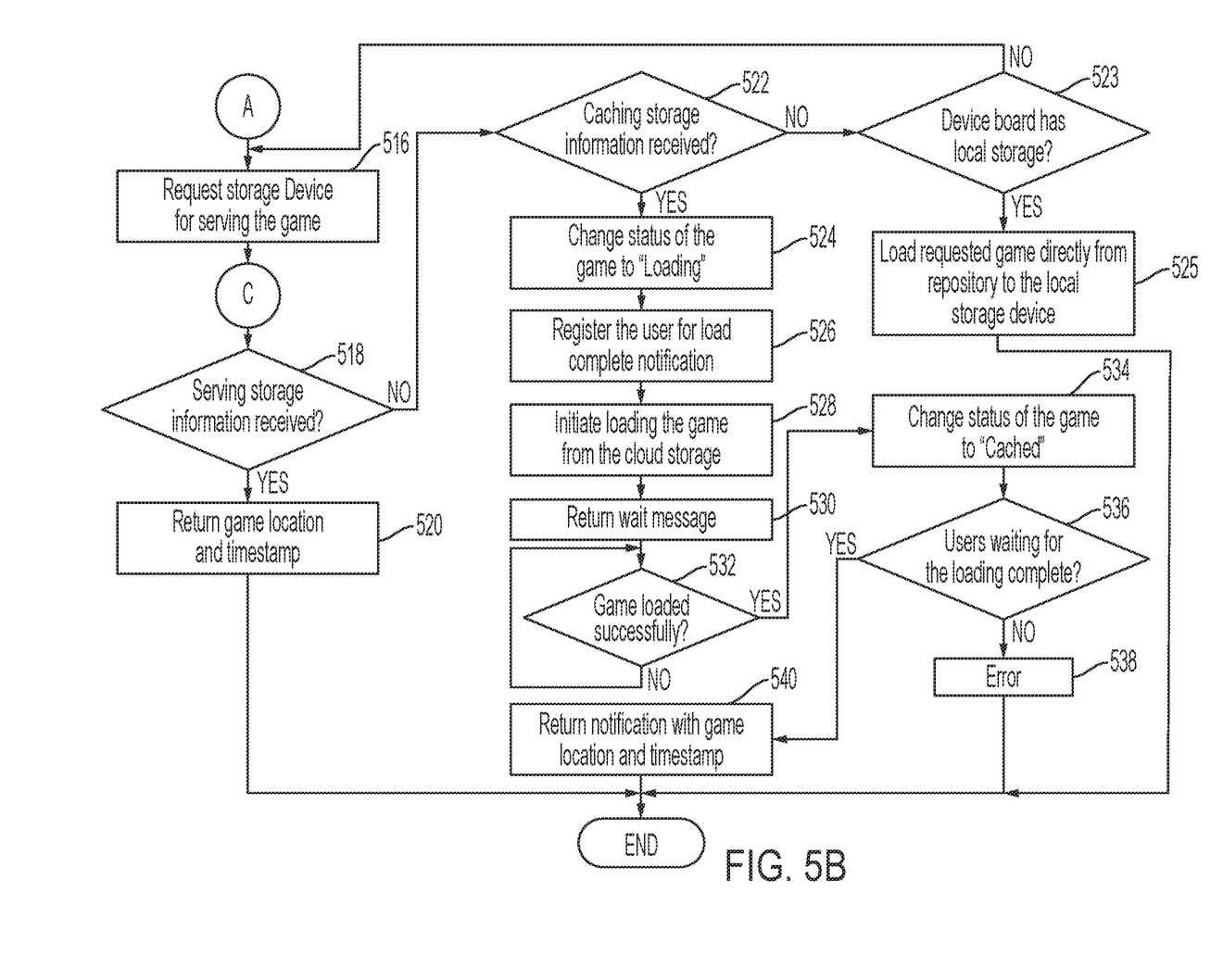

Referring to FIG. 5B, when the device board requests the location of the game to the catalog manager 308 at block 504, the method 500 may continue as shown in FIG. such that a suitable storage device for serving the game may be requested at block 516. For example, in some embodiments, the catalog manager 308 may communicate with the storage scheduler 310 to determine a suitable storage device from among the storage device pool 206 that can serve the requested game, and the method 500 may continue at block 554, which will be described in more detail below with reference to FIG. 5D. A determination may be made whether the serving storage device information is received at block 518. For example, in some embodiments, the catalog manager 308 may determine whether the storage scheduler 310 returns storage device information for a suitable storage device that can serve the game (e.g., see block 558 in FIG. 5D) without having to load the game from the repository (e.g., the cloud storage 204). If so (e.g., YES at block 518), the catalog manager 308 may return the game location and timestamp at block 520 and the method 500 may continue at block 506 in FIG. 5A such that the device board requests the local file system availability at block 510.

On the other hand, if the serving storage device information is not received (e.g., NO at block 518), a determination may be made whether caching storage device information is received at block 522. For example, in some embodiments, the catalog manager 308 may determine whether the storage scheduler 310 returns the caching storage device information for a suitable storage device that can load (e.g., that can store) the requested game from the repository (e.g., the cloud storage 204) for serving the requested game (e.g., see block 564 in FIG. 5D).

If not (e.g., NO at block 522), a determination made be made whether the requesting device board has a local storage 224 at block 523. For example, the catalog manager 308 may check if the requesting device board has the local storage 224. If so (e.g., YES at block 523), the requested game may be directly loaded from the repository to the local storage device 224 of the requesting device board at block 525. For example, the catalog manager 308 may load the game from the cloud storage 204 directly into the local storage 224 of the requesting device board (e.g., with the data coordinator 312), and in this case, may bypass the storage device pool 206. Otherwise (e.g., NO at block 523), the method may loop back to block 516, such that the user may need to wait until a suitable storage device is available.

On the other hand, if the caching storage device information is received (e.g., YES at block 522), a status of the game may be changed to loading at block 524, the user may be registered for load completion notification at block 526, and loading of the game may be initiated at block 528. For example, in some embodiments, the catalog manager 308 may inform the data coordinator 312 to load the game from the cloud storage 204 to the available storage device according to the caching storage device information received from the storage scheduler 310. In this case, the data coordinator 312 may read the game from the cloud storage 204 to load the game into the available storage device (e.g., an available namespace of the available storage device), and a wait message may be returned at block 530. For example, because no valid location has been received at block 506 (e.g., see FIG. 5A), the device board may continue to wait at block 508 for the load complete notification, and the method 500 may continue at operation 532 to determine whether the game has been successfully loaded.

A determination may be made whether the game is successfully loaded at block 532. For example, in some embodiments, the data coordinator 312 may notify the catalog manager 308 that the loading of the game is complete when it finishes the reading of the game from the cloud storage 204. If not (e.g., NO at block 532), the catalog manager 308 may continue to wait for the update at block 532. On the other hand, if the game has been successfully loaded (e.g., YES at block 532), the status of the game may be changed to "cached" at block 534, and a determination may be made whether any users are waiting for the loading to be complete at block 536. For example, in some embodiments, the catalog manager 308 may determine whether the user who requested the game to be loaded is still online, and/or whether there are any pending wait messages for users waiting for the game to be loaded.

If not (e.g., NO at block 536), an error state may occur at block 538, and the method 500 may end. On the other hand, if there are users waiting for the loading to be complete at block 536, a notification (e.g., a load complete notification) with the game location and timestamp may be returned at block 540, and the method may continue at operation 510 (e.g., see FIG. 5A). For example, in some embodiments, the catalog manager 308 may send the notification to the requesting device board, and the device board may request local file system availability for the loaded game at block 510.

Figure 5C:
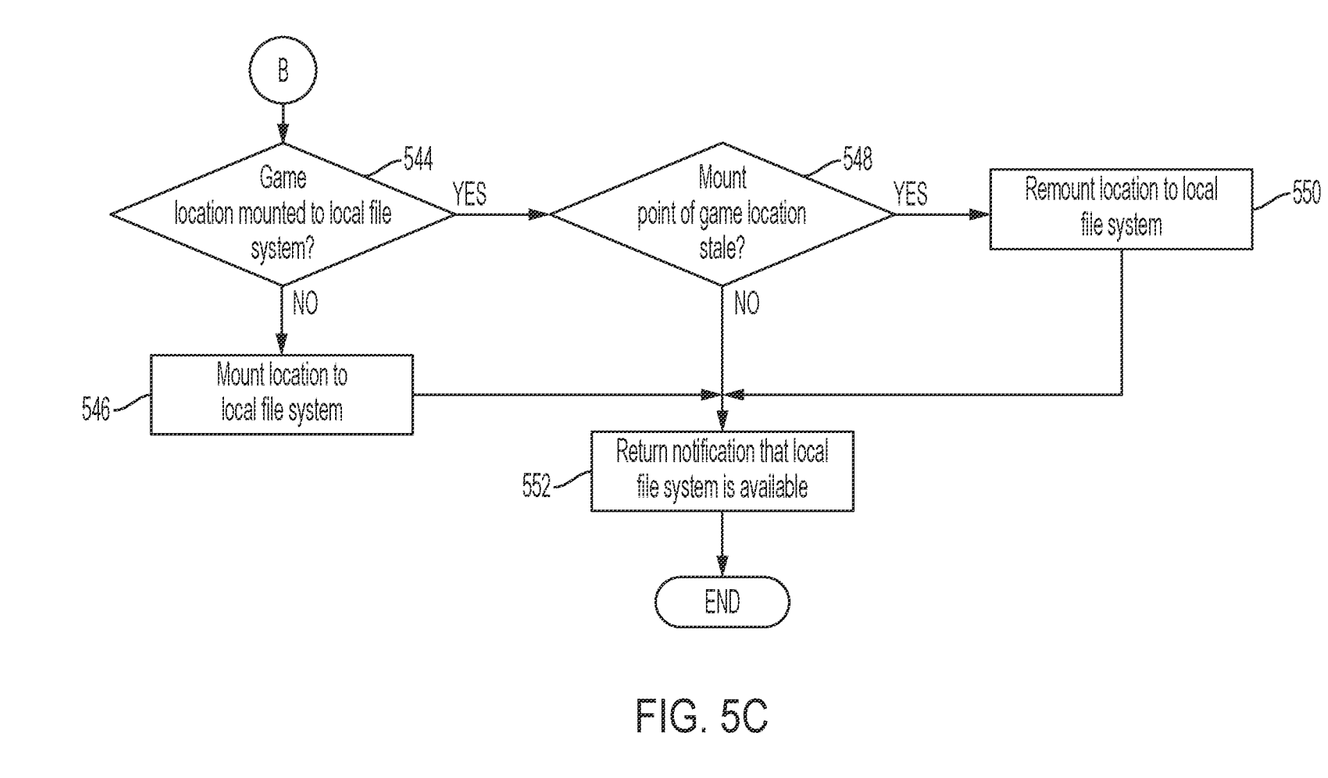

Referring to FIG. 5C, when the device board requests the local file system availability for the loaded game at block 510, the method 500 may continue as shown in FIG. 5C, such that a determination may be made whether the game location (e.g., namespace, partition, LUN, and/or the like) is mounted to the local file system 222 of the requesting device board at block 544. For example, in some embodiments, the data coordinator 312 may communicate with the FS coordinator of the local file system 222 associated with the device board to determine whether the local file system 222 has the updated namespace information corresponding to the loaded game. In this case, because each of the device boards (e.g., device boards) may have its own local file system 222, and may each load games to the any of the storage devices 236 to 242 of the storage device pool 206 at any time, when an update to the storage device pool 206 is made by one of the device boards, the other device boards may be unaware of the update as its local file system 222 may have stale namespace information. Accordingly, in some embodiments, the data coordinator 312 (e.g., via the FS coordinator) may mount or may remount the updated namespace information corresponding to the loaded game to the local file system 222.

For example, in some embodiments, if the game location (e.g., namespace, partition, LUN, and/or the like) is not mounted to the local file system 222 (e.g., NO at block 544), the game location may be mounted to the local file system 222 at block 546, and a notification may be returned that the local file system 222 is available at block 552. For example, in some embodiments, the data coordinator 312 may communicate with the catalog manager 308 to determine whether the local file system 222 has the current game location, and if not (e.g., NO at operation 544), the data coordinator 312 may mount the namespace (e.g., partition and LUN) corresponding to the game location to the local file system 222.

On the other hand, if the game location is already mounted on the local file system (e.g., YES at block 544), a determination may be made whether the mount point of the game location is stale at block 548. For example, because the content stored in the storage devices 236 to 242 of the storage device pool 206 may be modified by the data coordinator 312 of the device boards at any time; the game location may be changed, and the game location mounted on the local file system 222 may include stale game location information.

If the game location mounted on the local file system 222 is not stale (e.g., NO at block 548), then a notification may be returned that the local file system 222 is available at block 552, and the method may continue at block 514 (e.g., see FIG. 5A) such that the game is loaded through the local file system 222 into internal memory of the requesting device board (e.g., of a corresponding device board) to run (e.g., to execute) the game. On the other hand, if the mount point is stale (e.g., YES at block 548), the game location may be remounted to the local file system 222, and the notification may be returned such that the method 500 may continue at block 514 (e.g., see FIG. 5A).

Figure 5D:
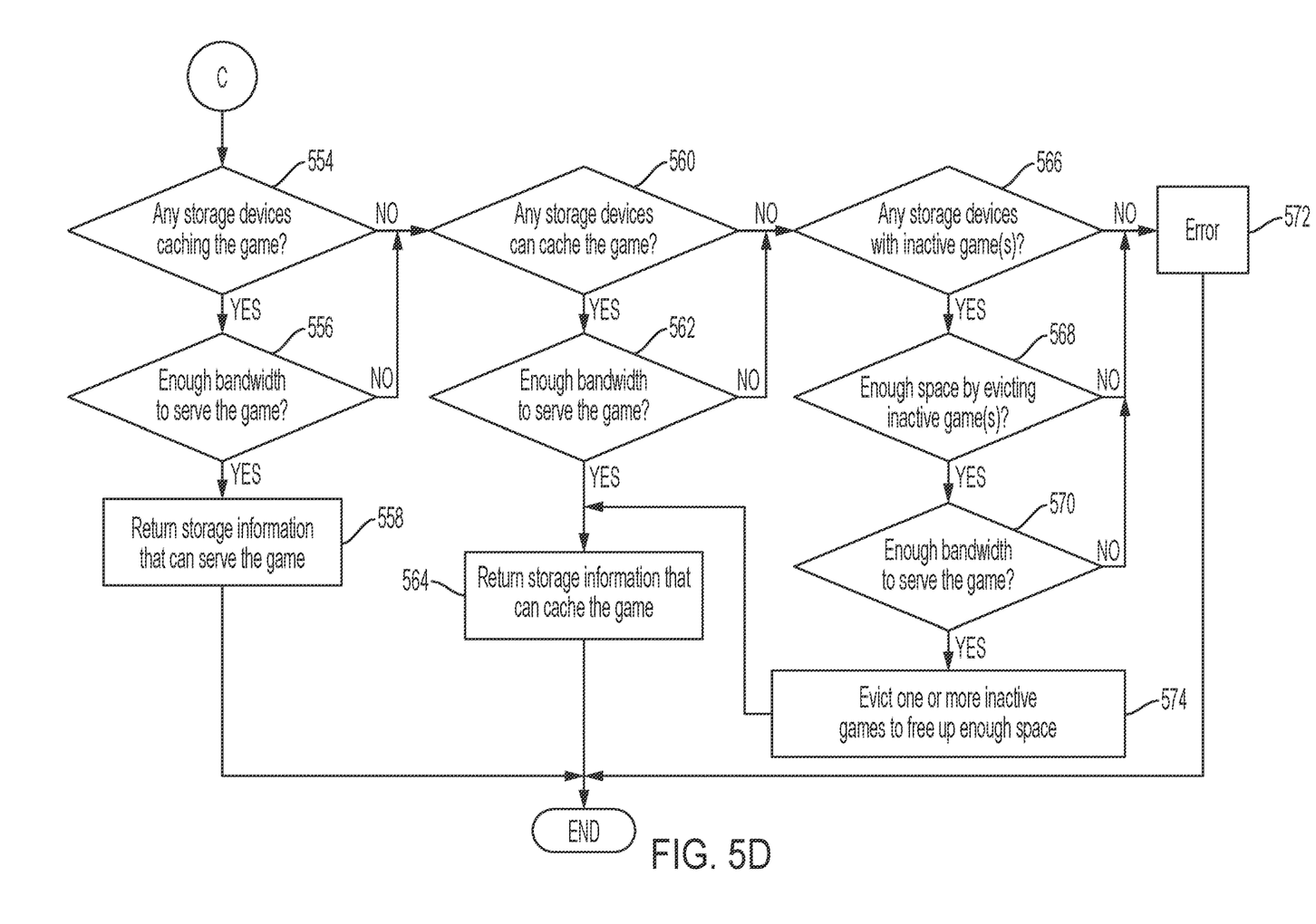

Referring to FIG. 5D, when the catalog manager 308 requests an available storage device from among the storage device pool 206 that can serve the requested game at block 516 (e.g., see FIG. 5B), the method 500 may continue as shown in FIG. such that a determination may be made whether any of the storage devices 236 to 242 of the storage device pool 206 currently caches (e.g., currently stores) the requested game at block 554. For example, in some embodiments, the storage scheduler 310 may check the namespaces of each of the storage devices 236 to 242 to determine if any of the storage devices 236 to 242 currently has the requested game (e.g., with catalog manager 308).

If so (e.g., YES at block 554), a determination may be made whether any of the storage devices currently caching the requested game have enough bandwidth to serve the requested game at block 556. For example the storage scheduler 310 may determine whether a load amount (e.g., a number of users) currently served by a storage device currently caching the requested game is greater than or equal to a threshold load value for that storage device. If a storage device currently caching the requested game has enough bandwidth to serve the requested game to the requesting device board (e.g., YES at block 556), then the storage information for that storage device is returned at operation 558, and the method 500 may continue at operation 520 (e.g., see FIG. 5B).

On the other hand, if no storage devices 236 to 242 from among the storage device pool 206 are currently caching the requested game (e.g., NO at block 554) and/or have enough bandwidth to serve the requested game (e.g., NO at block 556), then a determination may be made whether any of the storage devices 236 to 242 are available to cache (e.g., to load) the requested game from the repository (e.g., the cloud storage 204) at block 560. For example, in some embodiments, the storage scheduler 310 may check the namespaces of each of the storage devices 236 to 242 to determine whether any of the storage devices 236 to 242 have an available namespace (e.g., a free namespace) having enough space that can cache the requested game.

If so (e.g., YES at block 560), a determination may be made whether any of the available storage devices 236 to 242 have enough bandwidth to serve the requested game at block 562. For example the storage scheduler 310 may determine whether a load amount (e.g., a number of users) currently served by an available storage device is greater than or equal to a threshold load value for that storage device. If an available storage device has enough bandwidth to serve the requested game to the requesting device board (e.g., YES at block 562), then the storage information for that available storage device is returned at block 564, and the method 500 may continue at operation 524 (e.g., see FIG. 5B), such that the requested game is loaded (e.g., saved) in the available storage device.

On the other hand, if no storage devices 236 to 242 from among the storage device pool 206 are available to cache the game (e.g., NO at block 560) and/or have enough bandwidth to serve the requested game (e.g., NO at block 562), then a determination may be made whether any of the storage devices 236 to 242 have one or more inactive games at block 566. For example, in some embodiments, the storage scheduler 310 may check the namespaces of each of the storage devices 236 to 242 to determine whether any of the storage devices 236 to 242 have a namespace caching an inactive game (e.g., a game that is not currently executing on a device board) (e.g., with the catalog manager 308). If so (e.g., YES at block 566), a determination may be made whether any of the storage devices 236 to 242 with an inactive game have enough space by evicting (e.g., by removing) the inactive game at block 568. For example, in some embodiments, the storage scheduler 310 may determine whether a size of the namespace with the inactive game is large enough to cache the requested game if the inactive game is evicted from the namespace.

If the size of the namespace is sufficient to cache the requested game (e.g., YES at block 568), a determination may be made whether the storage device with the inactive game has enough bandwidth to serve the requested game at block 570. For example the storage scheduler 310 may determine whether a load amount (e.g., a number of users) currently served by the storage device with the inactive game is greater than or equal to a threshold load value for that storage device. If the storage device has enough bandwidth to serve the requested game to the requesting device board (e.g., YES at block 570), then the inactive game is evicted (e.g., is removed) therefrom at block 574, and the storage information for that storage device is returned at block 564. In this case, the method 500 may continue at operation 524 (e.g., see FIG. 5B), such that the requested game is loaded (e.g., saved) in the identified storage device.

On the other hand, if no storage devices 236 to 242 from among the storage device pool 206 has an inactive game (e.g., NO at block 566), has enough space even when the inactive game is evicted therefrom (e.g., NO at block 568), and/or has enough bandwidth to serve the requested game (e.g., NO at block 570), then an error state may occur at block 572 and the method 500 may end, such that the requesting device board may wait until a suitable storage device become available to serve the requested game.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use,"

"using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A content provider system comprising:
a repository configured to store a catalog of content;
one or more storage devices configured to store content loaded from among the catalog of content of the repository;
a hosted device configured to execute requested content from among the content stored in the one or more storage devices for a user device communicably connected to the hosted device; and
one or more processing circuits configured to identify a first storage device from among the one or more storage devices storing the requested content, determine an available bandwidth of the first storage device to serve the requested content to the hosted device by comparing a current load amount of the first storage device with a threshold load value for the first storage device, and store the requested content from the repository to a second storage device from among the one or more storage devices having enough space to store the requested content and to serve the requested content to the hosted device based on the comparing.

2. The system of claim 1, wherein the hosted device is configured to communicate using an interconnect.

3. The system of claim 2, wherein the hosted device is connected to the one or more storage devices by a network interface card (NIC) or a bus of the interconnect.

4. The system of claim 1, wherein the one or more storage devices comprise one or more shared namespaces associated with the content stored in the one or more storage devices, and the one or more shared namespaces comprise partition information and a logical unit number (LUN) corresponding to the content stored in the one or more storage devices.

5. The system of claim 4, wherein the one or more processing circuits are configured to:
receive a request for the requested content from the hosted device; and
identify the first storage device as storing the requested content based on the one or more shared namespaces thereof.

6. The system of claim 1, wherein the one or more processing circuits are configured to:
determine that the current load amount of the first storage device is less than the threshold load value; and
identify the second storage device from among the one or more storage devices for serving the requested content to the hosted device.

7. The system of claim 6, wherein to store the requested content to the second storage device, the one or more processing circuits are configured to:
identify an available namespace of the second storage device with enough space to store the requested content; and
load the requested content from the repository to the available namespace of the second storage device.

8. The system of claim 6, wherein to store the requested content to the second storage device, the one or more processing circuits are configured to:
identify an inactive content stored in an available namespace of the second storage device;
remove the inactive content from the available namespace of the second storage device; and
load the requested content from the repository to the available namespace of the second storage device.

9. A method for a content provider system, comprising:
identifying, by one or more processors, a first storage device from among one or more storage devices storing requested content from among content loaded from a catalog of content stored in a repository;
determining, by the one or more processors, an available bandwidth of the first storage device to serve the requested content to a hosted device configured to execute the requested content for a user device communicably connected to the hosted device by comparing a current load amount of the first storage device with a threshold load value for the first storage device; and
storing the requested content from the repository to a second storage device from among the one or more storage devices having enough space to store the requested content and to serve the requested content to the hosted device based on the comparing.

10. The method of claim 9, wherein the one or more storage devices comprise one or more shared namespaces associated with the content loaded in the one or more storage devices from among the catalog of content, and the one or more shared namespaces comprise partition information and a logical unit number (LUN) corresponding to the content stored in the one or more storage devices.

11. The method of claim 10, further comprising:
receiving, by the one or more processors, a request for the requested content from the hosted device; and
identifying, by the one or more processors, the first storage device as storing the requested content based on the one or more shared namespaces thereof.

12. The method of claim 9, further comprising:
determining, by the one or more processors, that the current load amount of the first storage device is less than the threshold load value; and
identifying, by the one or more processors, the second storage device from among the one or more storage devices for serving the requested content to the hosted device.

13. The method of claim 12, wherein the storing of the requested content to the second storage device comprises:
identifying, by the one or more processors, an available namespace of the second storage device with enough space to store the requested content; and
loading, by the one or more processors, the requested content from the repository to the available namespace of the second storage device.

14. The method of claim 12, wherein the storing of the requested content to the second storage device comprises:
identifying, by the one or more processors, an inactive content stored in an available namespace of the second storage device;
removing, by the one or more processors, the inactive content from the available namespace of the second storage device; and
loading, by the one or more processors, the requested content from the repository to the available namespace of the second storage device.

15. A computer-readable medium storing instructions that, when executed by one or more processors, cause the one or more processors to perform a method comprising:
identifying a first storage device from among one or more storage devices storing requested content from among content loaded from a catalog of content stored in a repository;
determining an available bandwidth of the first storage device to serve the requested content to a hosted device configured to execute the requested content for a user device communicably connected to the hosted device by comparing a current load amount of the first storage device with a threshold load value for the first storage device; and
storing the requested content from the repository to a second storage device from among the one or more storage devices having enough space to store the requested content and to serve the requested content to the hosted device based on the comparing.

16. The computer-readable medium of claim 15, wherein the instructions cause the one or more processors to perform the method further comprising:
determining that the current load amount of the first storage device is less than the threshold load value; and
identifying the second storage device from among the one or more storage devices for serving the requested content to the hosted device.

17. The computer-readable medium of claim 16, wherein to store the requested content to the second storage device, the instructions cause the one or more processors to perform the method further comprising:
identifying an available namespace of the second storage device; and
loading the requested content from the repository to the available namespace of the second storage device.

18. The computer-readable medium of claim 16, wherein to store the requested content to the second storage device, the instructions cause the one or more processors to perform the method further comprising:
identifying, by the one or more processors, an inactive content stored in an available namespace of the second storage device;
removing, by the one or more processors, the inactive content from the available namespace of the second storage device; and
loading, by the one or more processors, the requested content from the repository to the available namespace of the second storage device.

* * * * *